United States Patent [19]

Cabagnero

[11] Patent Number: 4,887,834
[45] Date of Patent: Dec. 19, 1989

[54] FOLDABLE BABY STROLLER CHASSIS

[75] Inventor: Ramon J. Cabagnero, Barcelona, Spain

[73] Assignee: Jané S.A., Barcelona, Spain

[21] Appl. No.: 111,032

[22] Filed: Oct. 20, 1987

[30] Foreign Application Priority Data

Oct. 22, 1986 [ES] Spain .................................. 8601059
May 27, 1987 [ES] Spain .................................. 8702010

[51] Int. Cl.$^4$ .............................................. B62B 7/08
[52] U.S. Cl. .................................... 280/642; 280/650;
280/47.36; 297/183; 297/488
[58] Field of Search ............... 280/641, 642, 644, 647,
280/650, 47.37 R, 47.36; 297/378, 379, 183, 488

[56] References Cited

U.S. PATENT DOCUMENTS

| | | | |
|---|---|---|---|
| 4,342,483 | 8/1982 | Takada | 297/488 |
| 4,506,907 | 3/1985 | Miyagi | 280/642 |
| 4,591,176 | 5/1986 | Kassai | 280/47.36 |
| 4,632,421 | 12/1986 | Shamie | 280/650 |
| 4,660,850 | 4/1987 | Nakao et al. | 280/47.36 X |
| 4,679,806 | 7/1987 | Gingline | 297/488 X |
| 4,733,882 | 3/1988 | Kassai | 280/642 X |

FOREIGN PATENT DOCUMENTS 292203 2/1986 Spain .
215125 5/1924 United Kingdom ............. 280/47.36

OTHER PUBLICATIONS

European Patent Application 0193729, Cabagnero, 9/10/86.

Primary Examiner—David M. Mitchell
Assistant Examiner—Michael Mar
Attorney, Agent, or Firm—McGlew & Tuttle

[57] ABSTRACT

A foldable baby stroller chassis includes a pair of front legs with a plate pivotally connected to the upper end of the legs and a pair of back legs having upper ends pivotally connected to the plate. A member is provided having a lower end with a clamp connection to the lower ends of the front legs and an upper bent arm portion with an intermediate pivotal connection to the back leg. A rear seat portion having an intermediate portion pivotally connected to the upper end of the bent arm portion and a plate, which is preferably triangular in shape, is connected to the rear seat portion adjacent its lower end and has an apex projecting forwardly in which a handle is connected pivotally. A joining plate is provided on each side of the upper end of the back legs and pivotally connected to the upper end of the front legs and the upper ends of the back legs. A bushing is carried on each side of a handle and extends and is movable relative to the handle. The bushing inlcudes a limit engagement hook and a limit stub arranged and spaced at locations along the handle. The stubs are selectively engageable with the hook portions of the bushing to position the chair in selected adjusted position either folded or extended. In addition, the construction includes an armrest assembly made of a covering material with a connection piece at each end which fits over and is connected to the upper end of the front legs and the upper end of the bent arm portion of the strut leg. The armrest portion has a slot into which a peg of a guardrail is insertable and the peg is lockable in the slot by a latch which may be released by a headpiece which may be pushed. The construction further includes a seat bottom which is pivoted on a cross piece of the front leg and connected to the rear seat portion and includes a footrest plate extending outwardly and downwardly from the front legs.

2 Claims, 2 Drawing Sheets

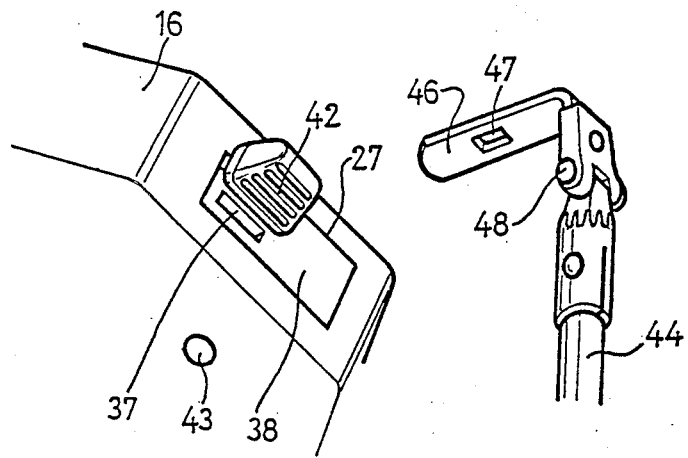
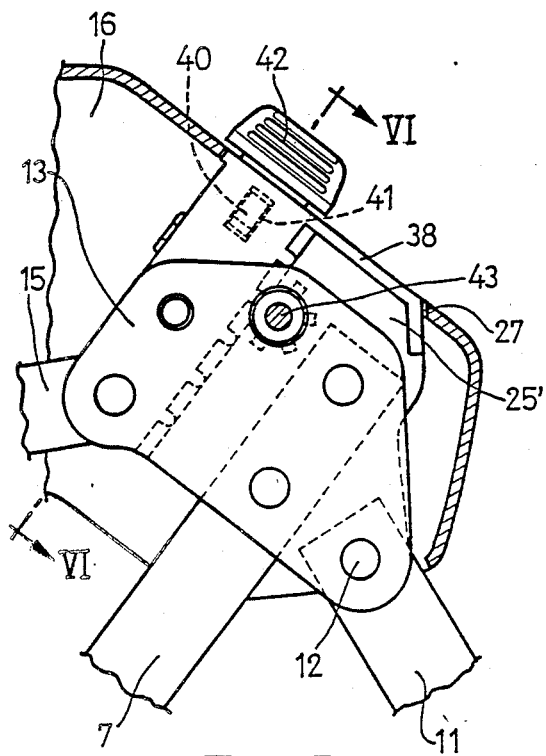
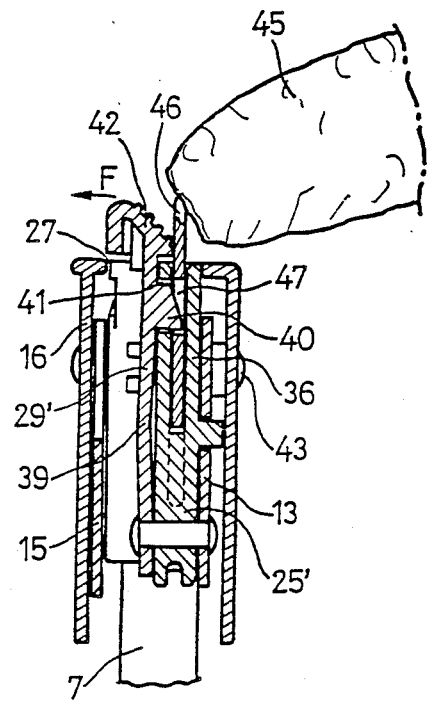
Fig. 4
Fig. 5
Fig. 6

FOLDABLE BABY STROLLER CHASSIS

BACKGROUND OF THE INVENTION

Field of the Invention

This invention refers in general to foldable structures and in particular to a new and useful foldable chassis for baby strollers with front guardrails.

The different types of chassis for baby strollers and the different types of folding systems they present have been well known here, there are those that juxtapose the handles and back against the armrests, seat, back and front legs, with folding and unfolding by moving the handles, pushing forward and downward or up and toward the back, respectively.

The present invention is an improvement over Spanish Utility Model No. 292,203 which refers to a chassis of this type, made up of a simple structure that is also comfortable for the child and at the same time is easy to fold and unfold. This chassis includes basically, on each side, the joint between the handle branch and the back leg via a bent arm that extends downward, to where it joins a strut whose other end is joined to the front leg. This leg is joined to the front side of the back leg by its upper part; the back leg is joined to a flatbar, which functions as an armrest and joins at the back end to the handle branch.

SUMMARY OF THE INVENTION

The present invention provides an improved construction with a more complete armrest that is more comfortable for the child and that gives the stroller a better finish. The chassis has also been given a handle with two positions, so that the stroller can be pushed with the seat facing the person who's pushing with the child's back to the direction in which the stroller is pushed, or with the child facing in the direction the stroller is pushed. With a special feature, the uncoupling of the handle is done manually and without any difficulty. The coupling in both positions is done automatically, by simply swinging the handle forward or toward the back.

According to the invention, the rear joint of the armrest and the bent arm is made on a section at the rear of the chassis that substitutes for the handle branch, which is now joined further down at the bottom of this section. This, and the front end of the armrest, including both pivots on which the two handle positions are coupled via a bushing which is acted on elastically, and that slides along it and presents hooks in the front and the back respectively.

The armrest is composed of a body like a long box where a core is housed. The core joins at its ends to the upper end of the rear section and that of the back leg. The back leg ends each have integrated pieces that, upon the unfolding of this stroller, cover both of the armrest openings. The back piece forms an anchoring element for a hook, while the front piece joins a plate to which a front leg is joined. The legs also supports an element for anchoring the front guardrail.

The front piece totally blocks the corresponding opening in the armrest, and, in order to keep the child from hurting his fingers, by inserting them in the opening made for the anchoring of the guardrail, there is a blocking piece. This blocking piece includes a casing leaving a small space which is occupied by the protruding head of an elastic safety catch, juxtaposed with this casing. The safety catch has a tooth that penetrates this casing and catches in the opening of a peg that forms the finished end which is hinged to the front guardrail and is inserted, immobile, in the casing.

Accordingly, it is an object of the invention to provide a foldable baby stroller chassis which may be locked in a folded and unfolded position and which includes an armrest assembly engaged between an upper bent arm portion of a strut which is clampable to the front legs into the upper ends of the front legs themselves. Construction includes a guardrail which may be engaged in and locked to each side of the stroller in the flat metal piece which is fitted over the front legs and has a latch therein for engagement with the guard piece.

A further object of the invention is to provide a foldable baby stroller chassis which is simple in design, rugged in construction and economical to manufacture.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which a preferred embodiment of the invention is illustrated.

BRIEF DESCRIPTION OF THE DRAWINGS

In the Drawings:

FIG. 4 is an exploded perspective view of the exterior appearance of the device that totally blocks the opening in the armrest, with the guardrail separated.

FIG. 5 is an enlarged sectional view of the part of the device that is housed inside the armrest; and FIG. 6 is a partial cross section of the device housed inside the armrest.

GENERAL DESCRIPTION OF THE PREFERRED EMBODIMENTS

Figure 1:
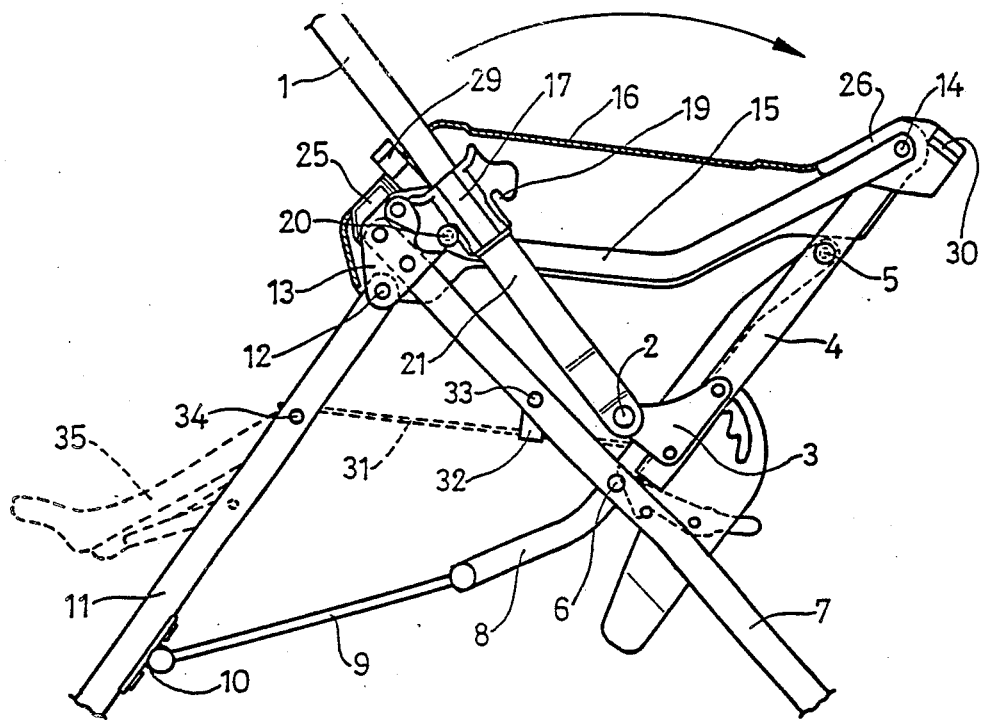
FIG. 1 is a side elevational view of the central part of the chassis of a stroller constructed in accordance with the invention and with the armrest shown in section.

Referring to the drawings in particular, the invention embodied therein comprises a foldable baby stroller chassis which includes an armrest 16 which is carried by pieces 25 and 26 which are engaged over the respective upper ends of front leg portions 11 and a rear seat portion 4 of the stroller according to the invention.

This chassis includes a handle shaped like an inverted "U" 1 whose branches are joined at the bottom 2 of each side to a triangular plate 3 that is attached to a rear section 4 which, through an intermediate point 5, is connected to a joint with an intermediate point 6 of a back leg 7 through a bent arm 8. The bent arm 8 extends and joins a strut 9 that at its lower end joins a clamp 10 attached to the lower part of the front legs 11 that are provided, as are the back legs, with the corresponding wheels.

The front legs 11 are joined near the top 12 to a plate 13 attached to the upper end of the back legs 7, which are joined through the plate 13 at the top 14 of the back sections 4 via a bent flatbar 15 that makes up the armrest 16.

Figure 2:
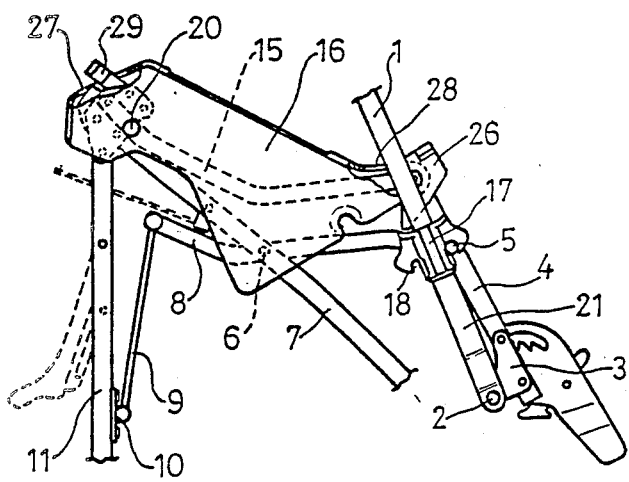
FIG. 2 is a similar view of the central part of the chassis, but in smaller scale and as an illustration of the semifolded position.

The branches of the handle include the sliding arrangement for both bushings 17 that form two opposing hooks 18 and 19, one in front and one in back, which permits the handle to be fixed in two positions; one front position (FIG. 1) and one back position (FIG. 2). The handle 7 is fastened when these hooks 18 or 19 are caught on a stub 20 provided on the side of the front end of the armrest 16 and a stub formed at the joining point 5 of the rear piece 4, respectively.

Figure 3:
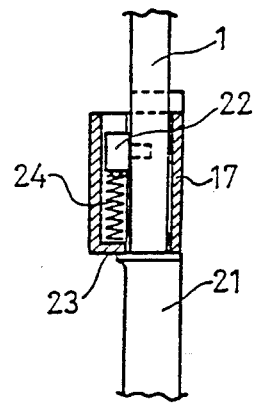
FIG. 3 is a side elevational view of a detail of the branch of the handle with the coupling bushing.

The bushing 17 moves vertically between two limits, a lower one, formed by an end-piece 21 on the branch of the handle, and another upper limit 22 anchored to the branch of the handle 1, between whose limit and the bottom 23 of the bushing there is a spring 24 (FIG. 3) that tends to push the bushing toward its low position (by urging the bracket downward), coupling them with the lower limiter.

To change the handle from one position to the other only requires the manual elevation of the bushings 17 on each arm 1, uncoupling them from the stub 20 or 5, and when the handle is moved forward or toward the back, the bushings will be coupled automatically with the corresponding stub, the coupling being aided when the outside, oblique edges of the hooks 18 and 19 collide with the stub, with the consequent compression of the spring 24.

The armrest 16 comprises a molded body made of plastic material, in the form of a long box open underneath, along which there is a flatbar core 15, on the ends of which both pieces 25 and 26 are attached and when the stroller is unfolded cover the respective openings 27 and 28 at the upper ends of the armrests, whose openings aid in the play of the end joints of the flatbar core mentioned earlier.

Attached to the plate 13 there is a coupling piece 29 that protrudes from the opening 27 of the armrest, and is where a front guardrail is coupled immobilely, and the piece 26 forms a casing with a coupling tooth 30 on the outside for the same immobile coupling of a hood.

The reference number 31 indicates the bottom of the seat which is supported by a U-shaped flatbar 32 that, at its ends, is joined to a point 33 on the back legs, and is supported in the front by a cross piece 34 that unites the front legs and constitutes the axle that supports a footrest plate 35.

The stroller is completed by a backrest, joined to the back of the seat and by other complements and accessories typical of this type of stroller, as provided with the Spanish utility model No. 292,203 referred to at the beginning.

According to the FIGS. 4, 5 and 6, the piece 25, molded in plastic material, is essentially flat and forms a casing 36 at the upper part, with an upper mouth 37 coinciding with a transversal upper fin 38 that coincides with the rectangular opening 27 of the upper, frontal part of the armrest 16, which is formed by a box with an inverted U-shaped section.

Between this fin 38 and the opening 27 there is, in one of the angles, a small space that is occupied by a semi-elastic safety catch formed by a semi-elastic flatbar 29' juxtaposed with the outside surface of the piece 25' and flatbar 29' presents a transversal bend 39 so that the tooth 40 that the flatbar presents tends to enter in the interior of the casing 36 through a window 41 in it, whose flatbar is finished with an exterior head 42 for moving the safety catch that closes the opening between the fin and the opening.

The indicated piece 25 is mounted with a joint on the inside of the armrest via an axle 43, and coupled to the inside surface of this piece, the metal plate 13 to which is attached the back leg 7 and the front leg 11.

This device is completed with a coupling element provided at the ends of a front guardrail, which includes a core 44 (preferably made of various jointed sections) covered with a case 45 made of elastic sponge material. This coupling element comprises a flat peg 46 that has a drill-hole 47 and is jointed through a bolt 48 at the ends of the core mentioned before.

The guardrail is coupled by inserting the pegs 46 in the casing 36, the teeth 41 preforating the elastic safety catch in the drill-holes 47 of the respective pegs.

To uncouple the guardrail, one presses the heads 42 of the elastic safety catches to the side and outward, as the arrow F indicates (FIG. 6), by which the teeth 40 on the safety catch will be withdrawn from the drill-holes 47 and the pegs 46 with the guardrails can be withdrawn.

The object of this invention, in its essence, can be put into practice in other ways that differ in detail from those indicated only by way of an example to which the protection being claimed will extend as well. This foldable baby stroller chassis will be able to be manufactured in whatever form or size, with the means and materials most adequate, and with the accessories that are most convenient, the components being able to be substituted by others that are technically equivalent, so that all of this is comprised in the spirit of the claims.

What is claimed is:

1. A foldable chassis for baby strollers comprising: a first and second rear section; a handle having first and second branches; first and second front legs; first and second back legs pivotally connected with respective corresponding first and second front legs; a strut member having a lower end with a clamp connected to the lower end of said front legs, and connected to a bent arm portion, said bent arm portion having an intermediate pivotal connection to said back legs said intermediate pivotal connection located intermediate said back legs length, said rear section having an intermediate portion pivotally connected to an upper end of said bent arm portion, a plate positioning member connected to said rear section adjacent its lower end and having a portion projecting forwardly of said rear section said handle being pivotally connected to said projecting portion of said plate positioning member, first and second arm rests pivotally connected to respective said first and second rear sections and pivotally connected to said first front and back legs adjacent the pivotal connection and said second front and back legs adjacent the pivotal connection respectively; first and second sliding bushings positioned about said handle first and second branches, each sliding bushing having a front and back hook; a front first and second stub connected to respective said first and second arm rests; rear first and second stubs connected to said respective first and second rear sections; upper limit means connected to said first and second handle branches for limiting the movement of respective first and second bushings in an upward direction; lower limit means connected to said first and second handle branches for limiting the movement of respective first and second bushings in a downward direction; and, biasing means positioned in each of said first and second bushings and engaging said upper limit means for urging said bushings toward said lower limit means; a guard rail having an engageable peg member said armrest having a slot into which said peg member is engageable, said armrest being adapted to be arranged between said legs, each of said armrests including a rectangular box-shaped member having a material covering said box-shaped member being connectable to upper ends of said front legs and to said rear sections, each of said armrests including a bar member within said covering, each said bar member being pivotally connected to an upper end of a corresponding rear section and an upper end of a corresponding back leg, each of said back legs having a plate on which said front leg is hinged and which supports a coupling piece means for said front guardrail.

2. A foldable baby stroller according to claim 1, wherein said coupling piece means includes a casing connected to said arm rest defining a slot opening, an engagement head assembly connected to said casing and movable between a first position and a second position and biased into said second position adjacent said casing, said engagement head assembly including a toothed portion engageable with a flat peg associated with one of said guide rail and hood.

* * * * *